US007831869B2

(12) United States Patent
Hana et al.

(10) Patent No.: US 7,831,869 B2
(45) Date of Patent: Nov. 9, 2010

(54) DDS LOGICAL DATA GROUPING

(75) Inventors: Andrew Hana, Bristol (GB); John P Hardwick, Bristol (GB); Robert Morling, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1195 days.

(21) Appl. No.: 10/986,976

(22) Filed: Nov. 15, 2004

(65) Prior Publication Data

US 2005/0172206 A1    Aug. 4, 2005

Related U.S. Application Data

(63) Continuation-in-part of application No. 10/764,501, filed on Jan. 27, 2004, now abandoned.

(30) Foreign Application Priority Data

Jan. 27, 2003    (GB) ................. 0301803.3

(51) Int. Cl.
G11C 29/00    (2006.01)
(52) U.S. Cl. .................................... 714/702
(58) Field of Classification Search .............. 714/702
See application file for complete search history.

(56) References Cited

U.S. PATENT DOCUMENTS

| 4,413,340 | A |   | 11/1983 | Odaka et al. |         |
|-----------|---|---|---------|--------------|---------|
| 4,477,903 | A |   | 10/1984 | Schouhamer et al. |    |
| 4,564,945 | A | * | 1/1986  | Glover et al. | 714/769 |
| 4,675,758 | A | * | 6/1987  | Tanaka | 360/121 |
| 5,763,987 | A | * | 6/1998  | Morikawa et al. | 313/309 |
| 5,789,063 | A | * | 8/1998  | Ishikawa et al. | 428/141 |
| 6,043,946 | A | * | 3/2000  | Genheimer et al. | 360/53 |
| 6,097,320 | A | * | 8/2000  | Kuki et al. | 341/58 |
| 6,238,767 | B1 | * | 5/2001 | McCormack et al. | 428/99 |
| 6,311,305 | B1 |   | 10/2001 | Sollish et al. | |
| 6,367,049 | B1 | * | 4/2002 | Van Dijk et al. | 714/761 |
| 6,408,416 | B1 | * | 6/2002 | Morley et al. | 714/763 |
| 6,718,505 | B1 | * | 4/2004 | Kravtchenko et al. | 714/756 |
| 7,024,616 | B2 | * | 4/2006 | Ohira et al. | 714/786 |
| 2001/0037484 | A1 | * | 11/2001 | Paterson | 714/784 |
| 2002/0004905 | A1 | * | 1/2002 | Davis et al. | 713/193 |

FOREIGN PATENT DOCUMENTS

| EP | 0 551 973 A2 | 7/1993 |
| EP | 0957484 A1 | 12/1998 |
| EP | 0 957 484 A1 | 11/1999 |

(Continued)

OTHER PUBLICATIONS

ECMA -319: Data Interchange on 12, 7mm 384-Track Magnetic Tape Cartridges-Ultrum-1 Fromat; Jun. 2001; Section 13:Format.;

(Continued)

*Primary Examiner*—Scott T Baderman
*Assistant Examiner*—Enam Ahmed

(57) ABSTRACT

A block of user data is formatted by arranging the user data block into a byte array having plural rows and plural columns of bytes. An error correction code is applied to individual ones of the rows of bytes, such that each row has four code words.

36 Claims, 8 Drawing Sheets

FOREIGN PATENT DOCUMENTS

| | | | |
|---|---|---|---|
| EP | 957484 A1 | * | 11/1999 |
| JP | 2000-067532 | | 3/2000 |
| JP | 2000-215620 | | 4/2000 |
| JP | 20022509331 T | | 3/2002 |
| WO | WO99/36913 | | 7/1999 |

OTHER PUBLICATIONS

ECMA-288: 3,81mm Wide Magnetic Tape Cartridge for Information Interchange-Helical Scan Recording-DDS-4 Format; Jun. 1999; Section 11: Format.

ECMA-139: 3.81 mm Wide Magnetic Tape Cartridge for Information Interchange-Helical Scan Recording-DDS Format; Jun. 1990, Chapter 9: Format.

ECMA-198: 3.81 mm Wide Magnetic Tape Cartridge for Information Interchange Helical Scan Recording-DDS-2 Format using 120m Length Tapes, $2^{nd}$ edition, Jun. 1995, Chapter 9: Format.

Translation of Japanese Search Report dated Jun. 27, 2008.

ECMA, "3,81 mm Wide Magnetic Tape Cartridge for Information Interchange—Helical Scan Recording—DDS-2 Format Using 120 m Length Tapes," 60 pages (Jun. 1995).

* cited by examiner

DDS LOGICAL DATA GROUPING

CROSS-REFERENCE TO RELATED APPLICATIONS

This application is a continuation-in-part of U.S. patent application Ser. No. 10/764,501, filed Jan. 27, 2004, now abandoned, and also claims the benefit of foreign priority under 35 U.S.C. §119 based on British Application No. 0301803.3, filed Jan. 27, 2003, the entire disclosures of which are hereby incorporated by reference.

FIELD OF THE INVENTION

The present invention relates to digital data storage (DDS) formatting of data and particularly, although not exclusively, to a method of and apparatus for writing data to a data storage medium, to a data processing apparatus for arranging data into a format, and to a medium carrying the formatted data.

BACKGROUND OF THE INVENTION

Referring to FIG. 1 herein, a known data storage format for writing data to a tape data storage medium has a logical data subgroup 100 known as a "G4 subgroup" comprising an array of data bytes arranged in rows and columns, there being 96 columns and 124 rows in a data group, each column being referred to as a "data fragment". Each column comprises 124 bytes of data numbered 0 to 123. Each row comprises 96 bytes, numbered 0 to 95.

The data subgroup has applied to it redundancy error correction coding (ECC). The applied redundancy error correction coding, which may, for example, be a Reed-Solomon coding, comprises 192 C1 code words, each column comprising a pair of interleaved C1 code words and 336 C2 code words extending over 112 of the rows. Each coded row comprises three interleaved C2 code words, each code word having 32 bytes. Shown in FIG. 1 is an example of first row 101 (i.e., row having number 0), comprising an interleaving of three C2 code words in row 0, where bytes of three code words A, B, C respectively of the first row are interleaved alternately such that individual bytes are ordered A, B, C, A, B, C, along the row. C2 code words of an additional 111 rows are arranged similarly.

Since each column comprises two C1 code words, the G4 data subgroup comprises 96×2=192 C1 code words. C1 code words run vertically down the columns, whilst C2 code words run horizontally across rows of the array. Each C1 code word extends along the entire height of its column, and each C2 code word extends across the entire width of its row. The C2 code words occupy rows 0-111, so that there are 112×3=336 C2 code words in the G4 data subgroup.

Referring to FIG. 2 herein, the entire G4 data subgroup is stored on a magnetic tape data storage medium in a single diagonal track 200 extending transversely and lengthwise of the tape as a stripe. In the prior art format, the physical width of the track a is 6.8 μm, the track density is 147 tracks/mm (3,735 tracks/inch), and the density of bits written along the tracks is 4,800 bits/mm (122,000 bits/inch). This results in a data storage capacity of 20 Gbytes of uncompressed data (40 Gbytes at 2:1 compression ratio) in a single data storage cartridge, containing a tape data storage medium of length 150 m. The mean time between failure (MTBF) reliability parameter of the prior art system, which is related to tape thickness, is 250,000 hours at a 30% duty cycle.

Data are written sequentially in parallel diagonal tracks as the tape moves past a write head. The plurality of tracks abut each other, so as to store a maximum amount of data on the tape. At a start of each track is provided a first synchronization tone 201 which allows a phase locked loop (PLL) to synchronize with the data. Similarly, at the end of each track is provided a second set of tones 202. A first entire G4 data subgroup is stored between the first and second tone regions in a single diagonal track. A second entire G4 data subgroup is stored between the tone regions of a second single diagonal track having an edge abutting an edge of the first track.

Due to increased data storage demands, ongoing objectives in the improvement of data storage devices include:

Increasing the amount of data which can be stored on a data storage medium;

Increasing the data rate for writing data to a data storage medium;

Improving reliability and byte error rates.

The above 3 parameters are interrelated, and attempts at increasing the amount of data storage capacity can affect the reliability of a tape data storage system, particularly a tape data storage system.

SUMMARY OF THE INVENTION

According to one aspect of the present invention, a block of user data is formatted by:

arranging said block of user data into an array of bytes, said array effectively comprising a plurality of rows and a plurality of columns of said bytes; and applying an error correction code to individual ones of said rows of bytes, such that each of said error correction coded rows includes four code words.

According to another aspect of the present invention, data are written to a linear tape data storage medium by:

arranging a block of user data into a data group of a logical array of data bytes effectively having plural rows and columns of said data bytes;

applying error correction coding to individual ones of said rows, such that individual ones of said rows are arranged into four code words;

writing said data group as a diagonal data track extending across the width of said tape data storage medium such that all of said data group is contained within said single data track extending across the width of said tape data storage medium, and transverse to the main length of said tape data storage medium.

According to a further aspect of the present invention there is provide a data processing apparatus for arranging data into a format for writing to a data storage medium, said apparatus comprising:

a memory for storing a data group comprising a plurality of bytes of user data effectively arranged logically in rows;

an error correction coding device for applying an error correction code to individual rows of said array, such that each of said individual rows is coded into 4 code words; and a write head for writing each of said data groups across the width of a tape data storage medium, such that each of said data groups is written along a corresponding single track extending across the width of said tape data storage medium, and transverse to the length of said tape data storage medium.

According to an added aspect of the present invention, a method of writing data to a linear tape data storage medium comprises:

arranging a block of user data into a logical group of data bytes, effectively comprising a plurality of rows of said data bytes and a plurality of columns of said data bytes;

applying an error correction code to said data group such that each of said columns of said data group is coded with two C1 code words;

applying an error correction code to individual ones of said rows, such that each of said individual rows is arranged into four C2 code words; and writing said data group into a single diagonal data track extending across the width and along the length of said tape data storage medium, such that all of said data group is contained within said single data track extending across said width of said tape data storage medium.

According to yet another aspect of the present invention, a tape data storage system comprises:

at least one write head for writing data to a magnetic tape data storage medium;

a transport mechanism for transporting said tape data storage medium past said write head;

a logical formatting device for formatting data into a data group comprising an array of bytes of data effectively arranged logically in a plurality of rows and a plurality of columns;

a memory device for storing said logical array of data; and an error correction coding device for applying an error correction code to individual ones of said rows of bytes, such that said individual rows are each coded into four code words.

An added aspect of the invention relates to a metal particle-type tape data storage media cartridge comprising a band of elongate tape having:

a width in the range 3.81 mm plus or minus 0.01 mm; and a length in the range 170 m plus or minus 5 m.

A further aspect of the invention concerns a storage medium comprising a plurality of tracks storing data. Each of the tracks includes M sequential fragments. Each of the fragments includes N sequential bytes. Each of the bytes includes P sequential bits. The M sequential fragments include N sets of interleaved bytes. Each of the N sets of interleaved bytes includes four interleaved C2 code words from the M sequential fragments.

Preferably, the storage medium is arranged so each of the fragments includes two interleaved sequential C1 code words. Each fragment also preferably has a fragment header including fragment and track identification, other information, as well as coding information.

An additional aspect of the invention relates to a storage medium comprising a plurality of tracks storing data. Each of said tracks includes sequential fragments $0, 1, 2, 3 \ldots j \ldots M$, and each of the fragments includes $1, 2 \ldots k \ldots N$ sequential bytes, where j is each of $1, 2 \ldots M$ and k is each of $1, 2 \ldots N$. Each of said bytes includes P sequential bits. Each of the fragments has two interleaved C1 code words. The fragments are arranged so that byte 0 of fragments (j-3), (j-2), (j-1), and j each form a byte of 4 C2 codewords. Byte 1 of fragments (j-3), (j-2), (j-1), and j each form a byte of four further C2 codewords. Byte k of fragments (j-3), (j-2), (j-1), and j each form a byte of four further C2 codewords.

In one embodiment, each of the tracks includes M and only M sequential fragments, and each of the fragments consists of the N sequential bytes, i.e., has N and only N sequential bytes. In this embodiment, preferably M=128 and N=124.

The medium is typically an elongated magnetic tape, and the tracks are diagonal tracks on the tape.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

Figure 1:
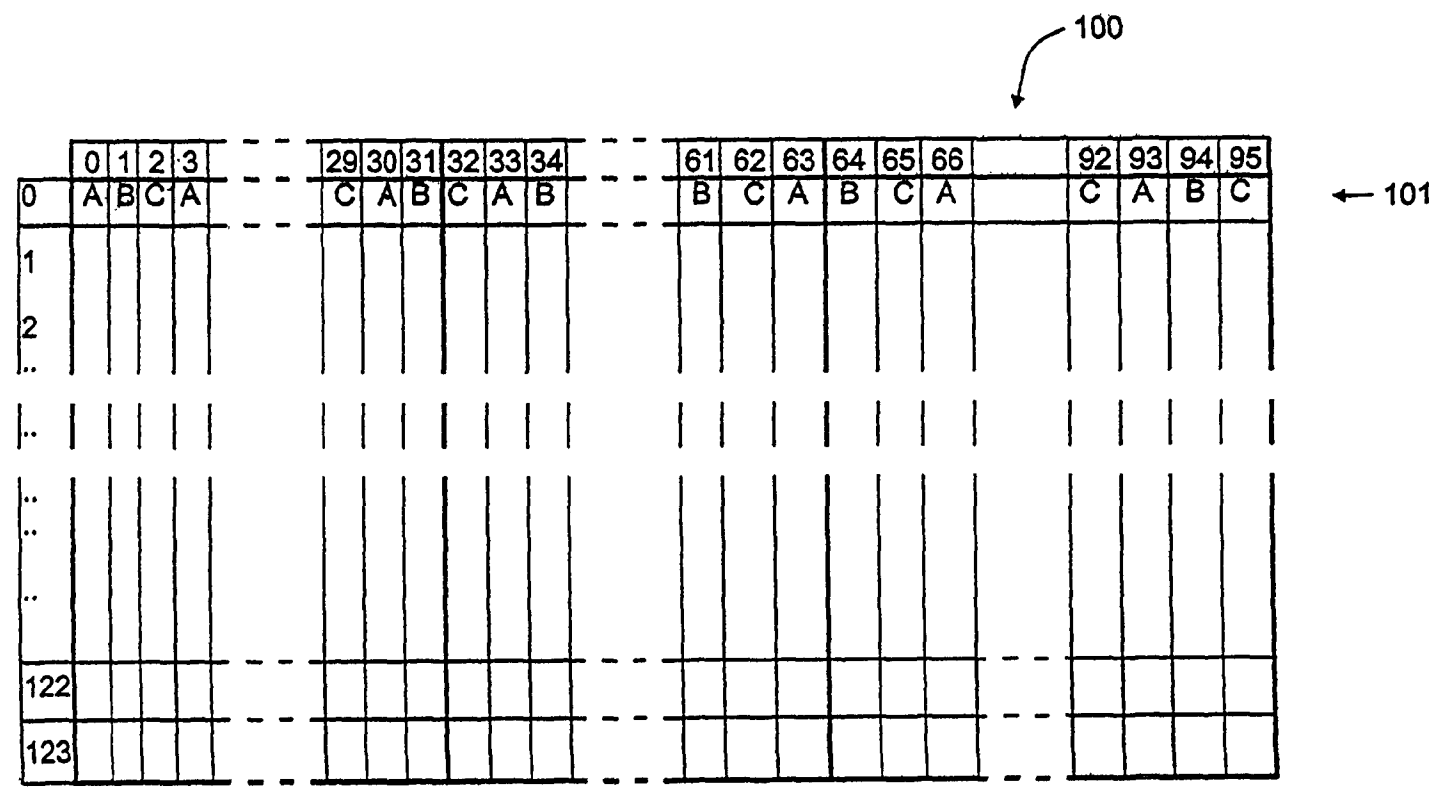

FIG. 1, as described, is a schematic illustration of a prior art G4 data subgroup included in a known tape data storage format;

FIG. 5 is a schematic illustration of a data subgroup according to a preferred embodiment of the present invention;

DETAILED DESCRIPTION

There will now be described by way of example a specific mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

As data storage densities on tape data storage media increase, making further significant progress in increasing data storage capacity becomes increasingly difficult due to physical limitations of the tape data storage medium, and due to mechanical tolerances of tape transport components and read/write heads. Specific problems frequently encountered include the following:

Firstly, to increase bit density on a tape, means that each bit of data must physically occupy a smaller area of a magnetic coating of a magnetic tape data storage medium. Consequently, a reduction in signal to noise ratio can be expecting in reading data as the bit density on tape increases.

Secondly, tracking errors are likely as there is a decrease in the width of diagonal tracks in helical scan systems of the type in which a rotating read/write head interacts with an elongated tape data storage medium. The tracking error problem occurs because the rotating head is in addition to and adds to the reduction in signal to noise ratio. The tracking error problem occurs because it is more difficult to align the rotating head with a track to be read, due to the reduced track width.

Thirdly, as track width decreases, there is an "integration problem" where a different tape drive unit is used to read a tape data storage medium, compared to the tape drive unit which has been used to write data to the tape medium. Each tape drive unit tends to follow its own characteristic shape of path as it stripes data tracks across the tape. This means that data written by one tape drive unit may not be readable by another, nominally identical tape drive unit.

Figure 2:
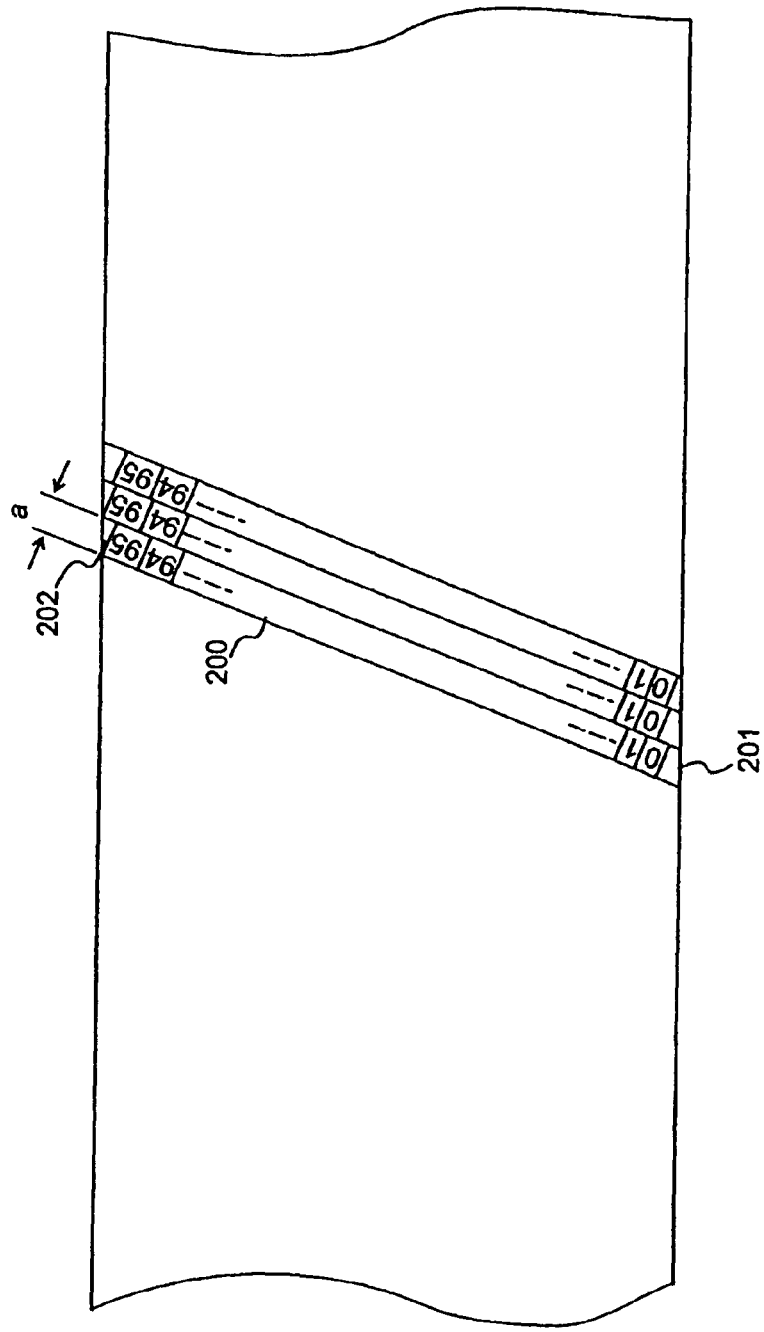
FIG. 2, as described, is a schematic illustration of a physical layout of a prior art G4 data subgroup written along individual corresponding respective tracks across a tape data storage medium.
Figure 3:
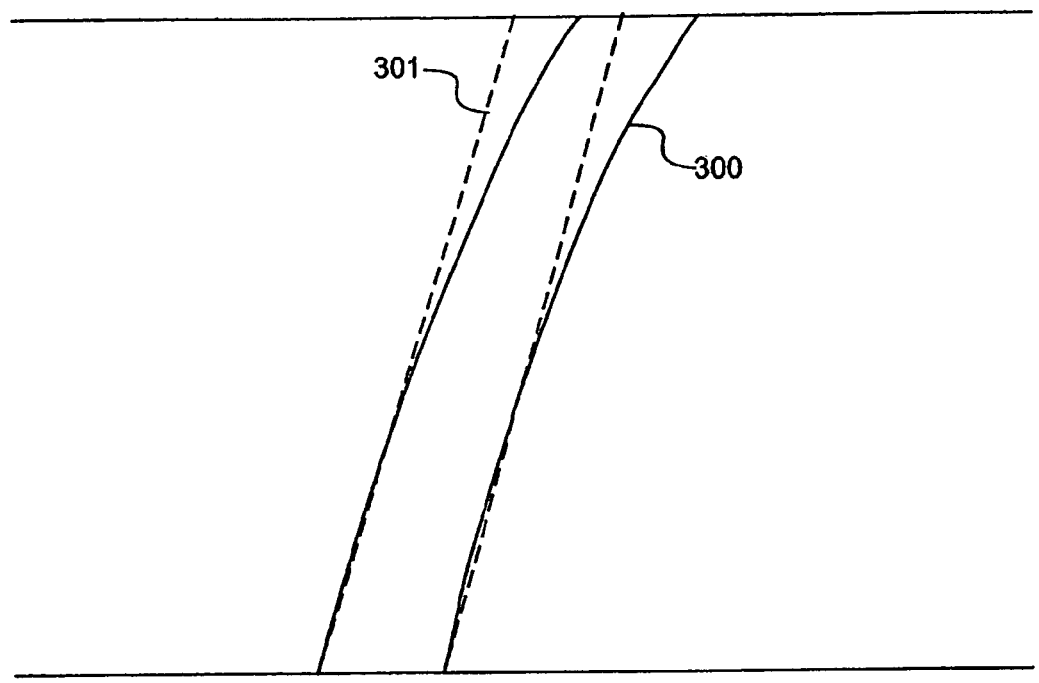
FIG. 3 is a schematic illustration of a problem of variation of "straightness" of a physical track written in a single stripe across the width of a tape data storage medium.

Referring to FIG. 3 herein, there is schematically illustrated in exaggerated form, one example of a characteristic diagonal path 300 traversed by a particular specific tape drive head across a tape width. Path 300 differs substantially from an ideal straight path 301, which represents a nominal path which every tape drive unit should theoretically follow when reading or writing a diagonal track across a width of tape data storage medium. As the track width is reduced, the tracking error due to a rotating read/write head following a path which deviates from the ideal straight path 301 becomes more significant, since the amount of deviation of the actual tape drive specific path relative to the width of the ideal nominal track increases.

A particular tape drive unit may have its own characteristic curve as the track is written across the tape. Since each tape drive unit has a different respective characteristic curve for tracks which it reads or writes, tracks must be wide enough such that a track written by a first tape drive, having its own characteristic curve can be read by a second tape drive having a different characteristic curve. As the nominal width of tracks decreases, interchangeability problems between different devices increase.

Fourthly, there is problem of random byte errors, which increase as the signal to noise ratio decreases. In the prior art, C1 error correction coding is used to correct for random byte errors.

There is also the problem of damage to a tape surface causing longer and non-random errors. In the prior art, C2 coding is used to alleviate the effect of extended tape damage, which most commonly takes the form of elongate scratches running along a length of a tape data storage medium.

Figure 4:
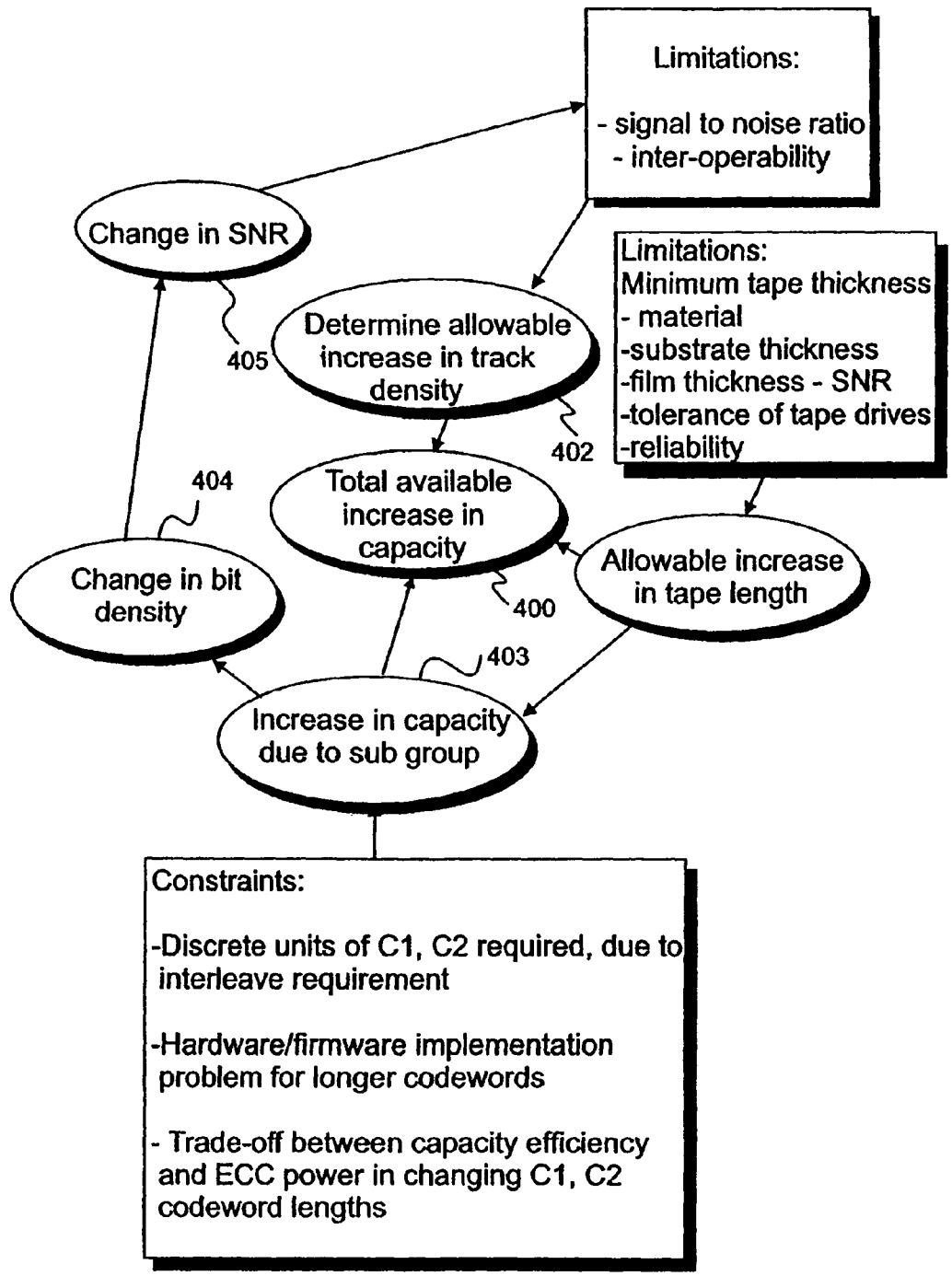
FIG. 4 is a flow diagram of a set of physical and practical considerations and limitations in achieving an overall increase in data storage capacity for a tape data storage system.

FIG. 4 is in the nature of a flow diagram including an interrelationship between parameters and limitations which need to be taken into consideration in achieving an overall increase in data storage capacity.

A total available increase in data storage capacity 400 depends on the maximum allowable increase in tape length 401, the maximum allowable increase in track density 402, and any increases in capacity which can be achieved by significant reorganization of the logical subgroup, on the assumption that one subgroup will be written across a single width of tape, and the width of tape will not be significantly different from the prior art tape width.

The allowable increase in tape length is limited by physical factors including the minimum tape thickness which can be achieved. The minimum tape thickness which can be achieved depends upon (1) substrate thickness and (2) the thickness of a magnetic material coating the substrate. In turn, the minimum practical substrate thickness which can be used depends upon reliability factors, and the type of substrate material which is being used.

Limitations on the substrate thickness are imposed by the design and tolerance of tape transport mechanisms. Varying the substrate thickness and substrate material also affects the reliability of the tape, particularly its susceptability to edge defects and damage along the edge of the tape. Varying the thickness of magnetic media on the film affects the signal to noise ratio of a signal which can be read back from the tape, which also has the consequence, that thinner tapes require a re-design of tape drives to improve tolerances to make them able to read a lower signal to noise ratio signal.

A determination of the allowable increase in track density 402 is limited by the problem of decreasing signal to noise ratio as the track density increases, and the problem of interoperability of tape drive units and tape cassettes as the track width is reduced.

Re-organization of a data subgroup 403 has an implication for changing the bit density 404. In turn, a change in bit density has a corresponding change in signal to noise ratio 405. Changes in signal to noise ratio limit the allowable increase in track density, and the thickness of magnetic media on the film.

Changes to the structure of the logical subgroup therefore have a non-intuitive effect on the total available increase in capacity of the tape. Capacity of the tape is a non-linear relationship with interleaved depth, since changing the logical structure of the data subgroup changes the bit density, and hence the signal to noise ratio which affects other parameters, in particular the allowable track density and physical characteristics of the tape, which dictate the allowable tape length. Each of these parameters, allowable track density and allowable increase in tape, also affect the total available increase in capacity 400.

According to a specific embodiment of the present invention, an improved capacity tape data storage system is provided by the following combination of features. The tape length is typical of prior art DDS tape. The increased tape length is achieved by reducing (1) tape substrate thickness, and (2) film magnetic medium thickness. Use of a reduced thickness magnetic film medium may provide a slightly worse signal to noise ratio than the prior art film, in the absence of any other changes in format. Further, reductions in substrate thickness may result in a different stretching characteristic compared to a prior art substrate. However, the disadvantages of reduced tape thickness are offset by providing a greater active tape surface area resulting from the longer tape.

Diagonal data track width is reduced compared to the typical prior art DDS diagonal track. According to a specific embodiment of the present invention, the diagonal DDS data tracks have a nominal width of 5.4 µm, compared to the prior art in which a nominal track width of 6.8 µm is employed. Reduction in track width, in isolation of other improvements, allows for an increase in data storage capacity for the same tape length, of the order of 12%, since more tracks can be written per unit area of tape. However, reduction in track width also carries with it (1) a corresponding reduction in signal to noise ratio in reading from tape, and (2) tracking errors. In addition, interchangeability of a tape between different tape drive units is affected. Further, because there are a higher number of tracks written per unit length of tape than in the prior art case, physical damage to the tape, for example elongated scratches, for the same scratch length cause greater data obliteration than in the prior art case, since there are more tracks per unit length than in the prior art case.

Subgroup Data Format.

In view of the above considerations, we have had to overcome a variety of problems to find a technical solution which allows acceptable performance on each of the above itemised parameters of (1) signal to noise ratio, leading to random bit errors; (2) interchangeability between different tape drive units; and (3) protection against the relatively increased effect of tape damage, in particular scratches or obliteration of data, whilst improving the overall data storage capacity.

To increase capacity, there were several logical data formatting options available.

Firstly, more C1 code words (i.e. 3 or more) per fragment could have been incorporated, keeping the same number of bytes per C1 code word as in the prior art format. This would have entailed columns of length 186 bytes, 248 bytes, and so on, where each additional code word per fragment contains 62 bytes.

Secondly, the ratio of user data bytes to redundancy bytes per C1 code word could have been altered.

Thirdly, the ratio of user data bytes to parity bytes in the C2 code words could be varied, in order to give a higher proportion of user data, thereby increasing capacity, at the expense of a lower proportion of C2 parity bytes. However, in a case where all other parameters, such as track width and physical byte length on tape are unchanged, this would result in a lower level of error correction capability for tape damage or tape defects, since the amount of redundancy coding in each C2 code word would be relatively reduced.

Each possible combination of parameter changes in a sub data group results in a different physical bit length, given that the whole data group is to be written across a diagonal single track extending across the width of the tape. The changes are to (1) the ratio of information bytes to parity bytes within a C1 code word; (2) the number of C1 code words within a data fragment; and (3) the relative ratio of user bytes to parity bytes within the C2 code word. The different bit lengths result in corresponding changes in signal to noise ratio, with longer bit lengths having a higher signal to noise ratio than shorter bit lengths.

To improve data storage capacity, the density of bits on the tape must increase. However, if the bit density is increased excessively, the corresponding reduction in signal to noise ratio reduces the readability of data on the tape. Therefore, the bit density needs to be increased in a manner in which the effect of reduced signal to noise ratio on the re-readability of data from the tape remains within acceptable limits, such that the tape can be re-read by the same tape drive unit which wrote the data in the first place, and can be re-read by tape drive units other than the unit that originally wrote the data to a particular tape. In other words, interchangeability of tape drive units must be maintained and the signal to noise ratio of the data on the tape must be above a threshold level for achieving interoperability of tape drive units and tape data storage media.

It is complex and time consuming to perform a full and comprehensive analysis of variation in bit length, and consequent signal to noise ratio for each of the variable parameters of C1 code word byte ratio. Such an analysis needs to consider (1) number of C1 code words per fragment; (2) C1 to C2 byte ratio; and (3) number of C2 code words per row is complex and time consuming. However, we have performed such an analysis that resulted in the logical data group format 500 of FIG. 5 that has two C1 interleaved code words per column and four C2 interleaved code words per row. The analysis led to experiments showing that the logical data group format 500 is an optimum solution for achieving increased capacity, without significantly degrading the interoperability of tape drive units and tape data storage media.

Figure 5:
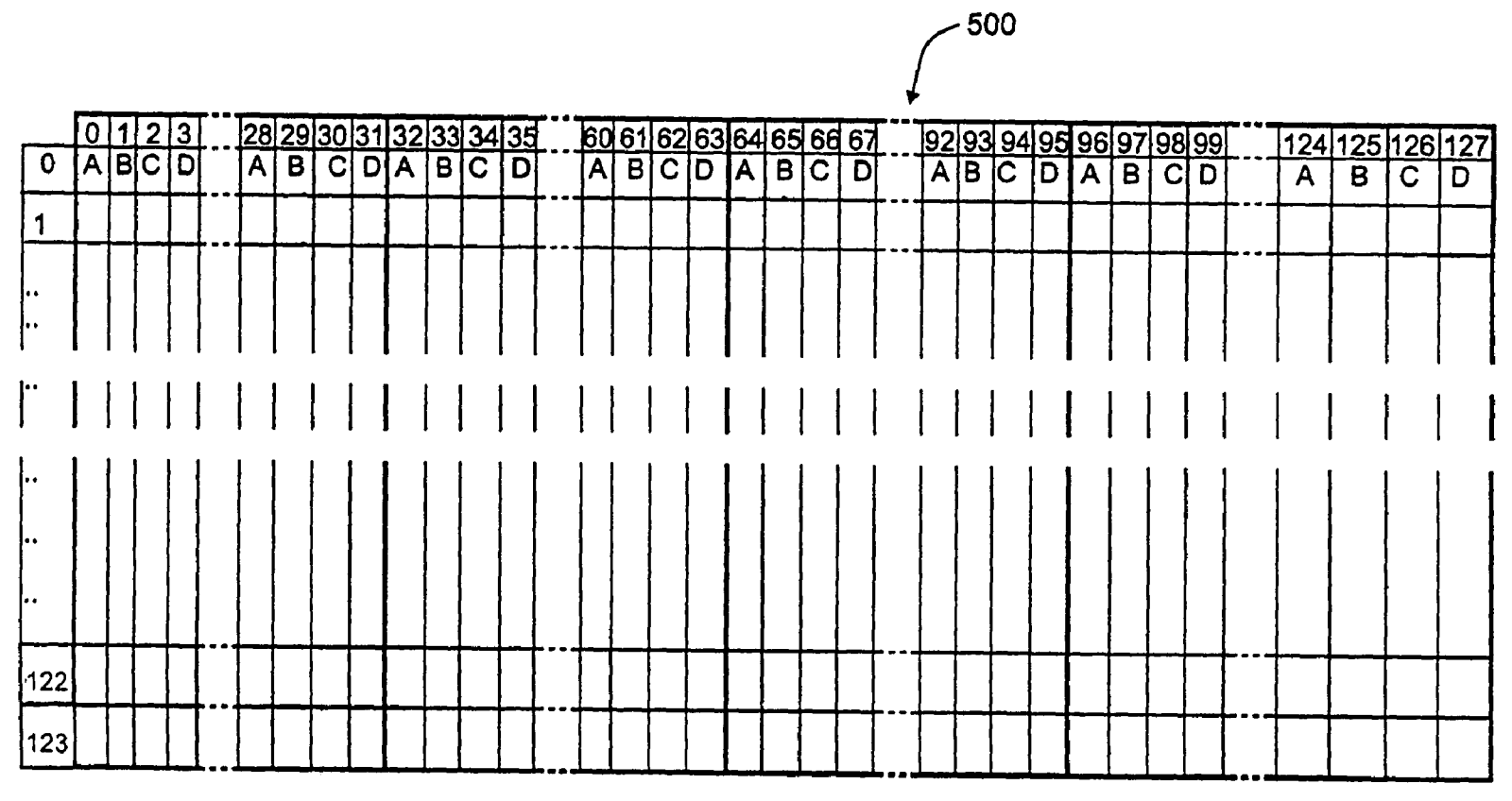

Reference is now made to FIG. 5 of the drawing, wherein format 500 is represented as a matrix of 128 columns (numbered 0-127) and 124 rows (numbered 0-123) that is helpful in describing how the data are recorded in diagonal tracks of a magnetic tape. Each rectangle (i.e. matrix position), in the matrix represents a single eight bit byte. All the bytes of the matrix form a logical subgroup that is recorded as a single diagonal track on the magnetic tape of FIG. 6. The bytes of each column of the matrix form a fragment that is recorded in one small region of the diagonal track on the tape. Each column of the matrix, i.e., fragment on the tape, consists of two interleaved C1 code words plus header bits; in a preferred embodiment there are 80 header bits.

The 128 bytes of each row of the matrix of FIG. 5 form four interleaved C2 code words, each having 32 bytes. Each C1 and C2 code word includes data bytes and redundant error correcting bytes, preferably in accordance with Reed-Solomon error correction coding.

The first bytes of the first, second, third and fourth C2 code words in row 0 of the matrix of FIG. 5 are respectively in columns 0, 1, 2 and 3; the second bytes of the first, second, third and fourth C2 code words in row 0 are respectively in columns 4, 5, 6 and 7; and the last four bytes of the first, second, third and fourth C2 code words in row 0 are respectively in columns 124, 125, 126 and 127. The bytes of the first, second, third and fourth C2 code words in row 0 are respectively represented by A, B, C and D in FIG. 5. Rows (1-111) of the matrix include four interleaved C2 code words determined on the same basis as the bytes of row 0.

The two interleaved C1 code words of column 0 are such that the first byte of the first C1 code word is at matrix location row 0, line 0 (and thus is the same byte as the first byte of the first C2 code word). The first byte of the second C1 code word is at matrix location row 1, column 0; the second byte of the first C1 code word is at the matrix location row 2, column 0; the second byte of the second C1 code word is at the matrix location row 3, column 0, etc. Each of rows 0 to 111 contains four C2 code words, i.e., there are 4×112 =448 C2 code words per G4 subgroup. The C1 code words run vertically, such that there are two C1 code words per fragment (column). For example, in column 0, rows 112 to 123 represent the C1 parity bytes for the bytes in rows 0-111. That is, column 0 contains two interleaved C1 code word. Each C1 code word has 62 bytes. The first 56 bytes are non-parity bytes taken from rows 0-111 of column 0. The last 6 bytes are the parity bytes and go into rows 112-123 of column 0. When a G4 subgroup is written to tape, (1) each column is preceded by a 10-bit sync=80 -bit header, and (2) each 8 bit byte of the fragment is converted into a 10-bit value that is recorded on the tape.

Figure 6:
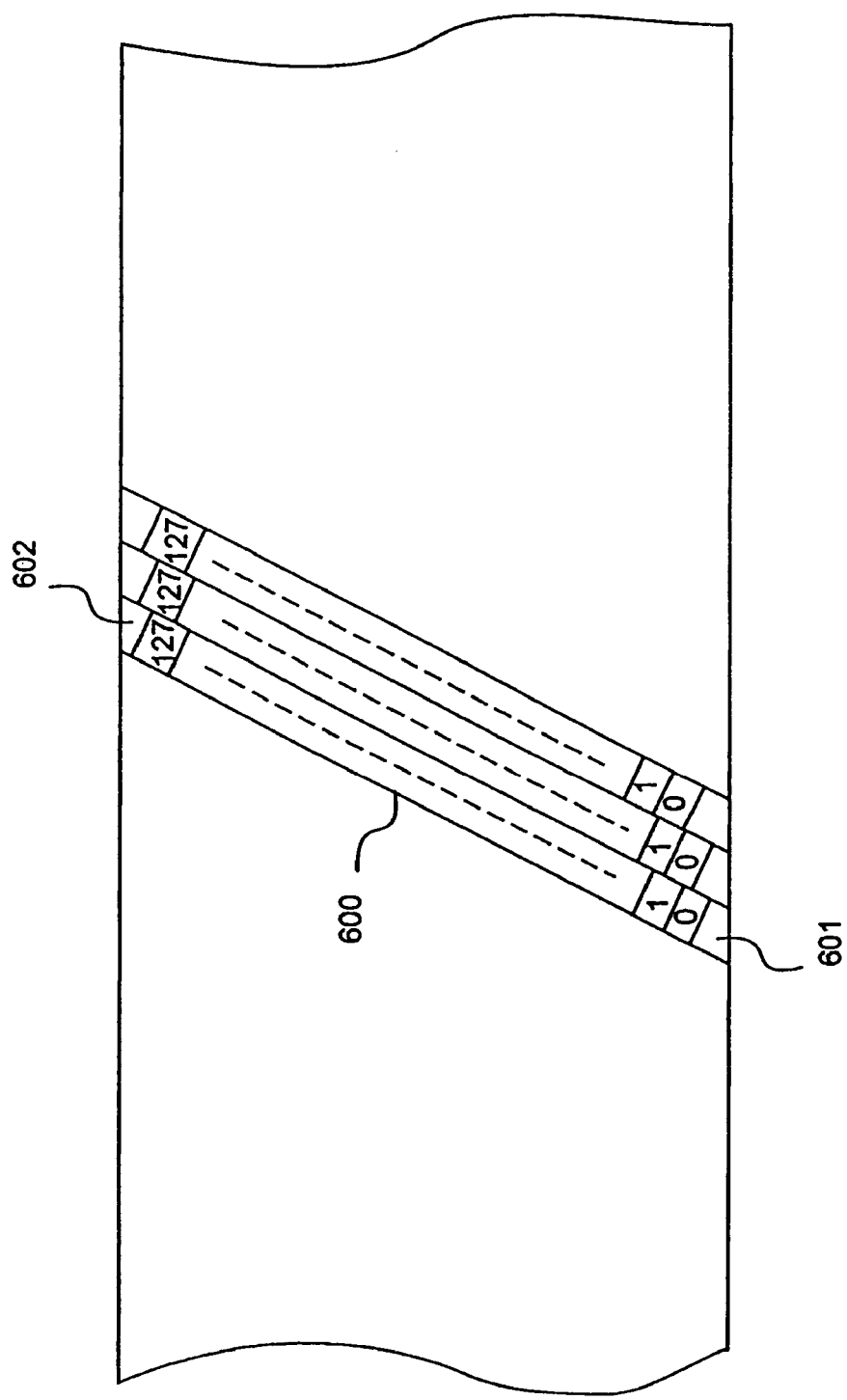
FIG. 6 is a schematic illustration of a physical layout of the data subgroup of FIG. 5, as written along diagonal data tracks of a tape.

All the bytes in the matrix are sequentially written into a single diagonal track as illustrated in FIG. 6 such that all 1,330 of the bits in column 0 are written in sequence into fragment 0 in track 600. Thus, eight bits of row 0, column 0, are written into sequence into fragment 0, followed by the eight bits of row 1, column 0 being sequentially written into fragment 0, etc., until the eight bits of row 123 are written into fragment 0. Thus when the write operation of fragment 0 of track 600 has been completed, fragment 0 of track 600 stores two C1 code words plus the 80 header bits of the fragment. After the bits of column 0 of the matrix have been written into fragment 0 of track 600, the bits of column 1 of the matrix are sequentially written into fragment 1 of track 600 in the same manner as described for writing the bits of column 0 into fragment 0 of track 600. Sequential writing of the bits of the remaining columns 2-127 into fragments 2-127 of track 600 proceeds in the same manner as described for writing the bits of columns 0 and 1 into fragments 0 and 1 of track 600.

Thus a single diagonal track 600 on the tape of FIG. 6 includes 124×128=15,872 data bytes, each having eight bits, with each of the 126,976 data bits in a single track 600 having a length of 125 nanometers along the track length.

Thus, each diagonal track includes 128 fragments that are sequentially written onto and read from the track. Each fragment has two interleaved C1 code words in accordance with the matrix of FIG. 5. The 128 fragments are arranged in accordance with matrix 500, FIG. 5, to include 124 set of sequential C2 code words. Each of the 124 set of C2 code words is divided into four interleaved C2 code words, each having 32 bytes.

Generalising, the tape of FIG. 6 is a storage medium having plural data storing tracks, wherein each of the tracks consists of M sequential fragments, and each of the fragments includes N sequential bytes arranged to form two interleaved sequential C1 code words. The M sequential fragments include N sets of interleaved bytes each consisting of four interleaved C2 code words from the M sequential fragments.

In another generalization, the tracks include sequential fragments 0, 1, 2, 3 ... j ... M, wherein each of the fragments includes 1, 2 ... k ... N sequential bytes, and where j is each of 1, 2 ... M and k is each of 1, 2 ... N. Each of the fragments includes two interleaved C1 code words. The fragments are arranged so that bytes 0 of fragments (j-3), (j-2), (j-1), j respectively store bytes of four interleaved first C2 code words; bytes 1 of fragments (j-3), (j-2), (j-1), j respectively store bytes of four interleaved second C2 code words; and bytes k of fragments (j-3), (j-2), (j-1), j respectively store bytes of four interleaved $k^{th}$ C2 code words. Each of the tracks has M and only M sequential fragments and each of the fragments consists of the N sequential bytes. In the specific embodiment of FIG. 6, M =128 and N =124.

Track 600 has a physical width of 5.4 μm plus or minus 0.1 μm, resulting in a track density along the tape length in the range 181-189 tracks/mm, and nominally 185 tracks/mm (4,597-4,800.6 tracks/inch, and nominally 4,699 tracks/inch ). Each data fragment is written across a track with a bit density in the range 6,220-6,614 bits/mm, and nominally 6,417 bits/mm (158,000-168,000 bits/inch, and nominally 163,000 bits/inch)

A plurality of tracks are written sequentially as the tape moves past a write head, the plurality of tracks abutting each other so as to store a maximum amount of data on the tape.

A first synchronization tone 601 at the start of each diagonal track causes a phase locked loop (PLL) to synchronize with the data. A second set of synchronization tones 602 is at the end of each diagonal track. One data subgroup, consisting of the matrix of FIG. 5, is stored between the first and second-tone regions, and extends across the width of the tape in a straight diagonal line.

The tape data storage medium itself comprises a single band of tape, having a length of 170 m plus or minus 5 m. The tape is of a metal particle (MP) type, having an overall thickness of 5.3 μm plus or minus 0.02 μm. The tape comprises a base film substrate having a thickness of 3.6 μm plus or minus 0.02 μm. The reverse side of the substrate, i.e., the side opposite to the side including a magnetic coating, is coated with back coating, and an upper side of the substrate is coated with an undercoat layer, and on top of the undercoat layer, there is formed the magnetic coating. The width of the tape is 3.81 mm plus or minus 0.01 mm.

Initially, solutions which involved only increasing tape length and increasing track density, but without increasing byte density were investigated. However, moving from a 6.8 μm track width to a 5.4 μm track width, i.e. a 20% reduction in track width, for example, means that the increased mechanical tolerances of the tape drive required to achieve interoperability of tape drive units and tape cartridges would make such drives technically difficulty to produce, and uneconomic.

Further, loading a tape longer than about 200 meters in a single cartridge requires a reduced tape substrate thickness, which increases interoperability problems, and introduces further problems in tape transport. These problems require significant changes to tape drive mechanisms, again making tape drive units technically difficult to manufacture, and uneconomic. Using a thinner substrate makes the tape more prone to damage at each edge of the tape.

Increasing capacity by a combination of increased tape length, and reduced track width presents all of the above problems in combination. Combining the finer tolerances required for a thinner track width with a tape having a thinner substrate decreases the interoperability of tape drive units and tape cartridges. The thinner substrate results in a less durable tape which is much more subject to mechanical damage, particularly at the edges of the tape. Further, there is the problem of producing a thin enough substrate to produce a tape of longer than approximately 200 meters length, to fit into a known format cartridge. As a practical matter, producing such a thin substrate film whilst achieving reliability of the tape is at present not feasible.

Consequently, achieving significant increases in data storage capacity by varying physical parameters of track length and track width (track density) alone do not give a high enough increase in data storage capacity over prior art systems of comparable size and weight. Increasing tape length and track density necessitates finer tolerances of tape drive units and tape data storage cartridges, which in turn, reduces the interoperability of tape drive units and cartridges, and also results in mechanical tolerances which are too high to produce a practical commercial tape data storage system.

We considered changing bit density, as a way of increasing data storage capacity. Constraints on increases in bit density arise from the logical format of a data subgroup, which is written in a single track striped across a width of tape. In a data subgroup which has applied to it error correction coding (ECC), the number of code words into which the data is sub-divided can only be increased in integer units of one code word. Therefore, if the size of a data subgroup is to be increased by adding bytes, the number of bytes must correspond with an integral number of C1 and C2 code words. Therefore, in FIG. 5, extensions to the subgroup can be made by addition of an extra C2 code word per row or one or more extra C1 code words per column (fragment). This has a consequence that the length of each byte physically written to tape is not a continuously variable parameter, but is only variable in discrete steps, depending upon whether the number of C1 code words and/or C2 code words are to be increased. Since bit density is directly related to signal to noise ratio, signal to noise ratio is not a continuously variable design parameter, but can only change in discrete steps.

By selecting a C2 code word length of 32 bytes, the ratio of user data bytes to parity bytes is preserved, without reducing further the capability of the C2 error correction to rectify the same number of missing data bytes. Any reduction in C2 code word length would involve a lower ratio of user data bytes to parity data bytes. Therefore, reducing the interval in signal to noise ratio by reducing the C2 code word length would involve a corresponding reduction in data capacity within each C2 code word.

Therefore, the variable parameters in selecting the data group format include (1) C1 and C2 code word lengths, each of which has implications for efficiency of (a) correctability of data, and (b) data capacity within the code word; (2) the number of C1 code words in each data fragment (column), and (3) the number of C2 code words in each row.

The length of the C2 code word cannot be reduced beyond a limit which is dictated by the minimum length of scratches or other long defects along the tape, which must be correctable by the C2 code words. Each time a new C2 code word length is considered a full analysis of the correcting capability of that C2 code word type needs to be carried out.

Further, the minimum length of a C2 code word is limited by the proportion of user data to parity data within each C2 code word which is necessary in order to achieve optimum data storage capacity. Reductions in C2 code word length lead to a less efficient ratio of user data; in other words, shorter C2 code words produce proportionately less data storage capacity than longer C2 code words.

Also, increasing the code word length involves additional hardware. Consider the example of a 32 byte C2 code word to get the same error correcting capability out of a 64 byte C2 code word. A code word which is more difficult to create in hardware or firmware is obtained, requiring hardware or firmware which is more difficult to implement. Therefore, there is a technical disadvantage in increasing the C2 code word length. The longer the code word, the more powerful it becomes, but the more difficult it becomes to create in hardware or firmware. Therefore, a compromise needs to be made between increasing the length of code word in order to increase the error correction capability of that code word, and between the additional difficulty in implementing a system for creating that code word in hardware and firmware.

Choosing the optimum values of C1 code word length, C2 code word length, number of C1 code words in a data fragment, and number of C2 code words in a row requires detailed analysis, and a consideration of trade offs and optimizations. Arriving at the combination of C1 and C2 code word number and C1, C2 code word lengths which provides an optimum performance is a non-trivial task.

In order to achieve a significant increase in data storage capacity, for example to store 40 Gbytes of uncompressed data on a single tape cartridge, (80 Gbytes at 2:1 compression ratio) requires an increase in density from the prior art density of 122 Kbits per inch. In arriving at the specific embodiment described herein, the C1 and C2 parameters including code word length and number of code words were optimized, in order to give the required number of Kbits per inch of user data, in order to achieve the target capacity of a single tape data storage medium. There are various possible options giving for example 36 Gbytes, 38 Gbytes, 40 Gbytes or 45 Gbytes of uncompressed capacity on a single tape. However, each of these options gives a different bit density, and hence a different signal to noise ratio. Further, the relationship between signal to noise ratio and capacity is not intuitive, since achieving each capacity requires a different C1/C2 combination, and a different ratio of parity bytes to user data bytes within the code words. Therefore, for example a data capacity of 36 Gbytes on a single length of tape may give a worse signal to noise ratio than using another combination of C1/C2 code words which gives 38 Gbytes of data on a tape, due to the different overhead of the parity bytes within the specific choice of error correction coding used.

In the specific embodiment described herein, using four interleaved code words per row, enabled a tape data storage system having only a marginal increase in tape length, and only a relatively marginal decrease in track width to be attained. The use of four code words per row is important because of the constraint that C2 code words can only be added or subtracted from rows in whole units of code words. The specific embodiment resulting from FIG. 5 achieves a significant increase in overall data storage capacity to give of the order of 40 Gbytes of uncompressed data storage on a single tape data storage medium. The signal to noise ratio resulting from the bit density was within a limit which could be processed on the basis of a practical manufactured tape data storage system. This has the advantage that a slight increase in tape length does not necessitate a complete re-design of the tape substrate and tape film. Instead, tape re-design is a fine tuning exercise, rather than a fundamental re-design of the tape data storage medium itself. In the specific embodiment adopted, the tape data storage medium is thinner than the prior art tape. However the reduction in thickness is small enough that it has been achieved by a reduction in magnetic film media thickness rather than a reduction in the thickness of the substrate material. The thickness is such that metal particle (MP) type tape can be used.

On the other hand, the use of five code words per row would have necessitated using a metal evaporated (ME) type tape in order to achieve the required byte density and signal to noise ratio.

Figure 7:
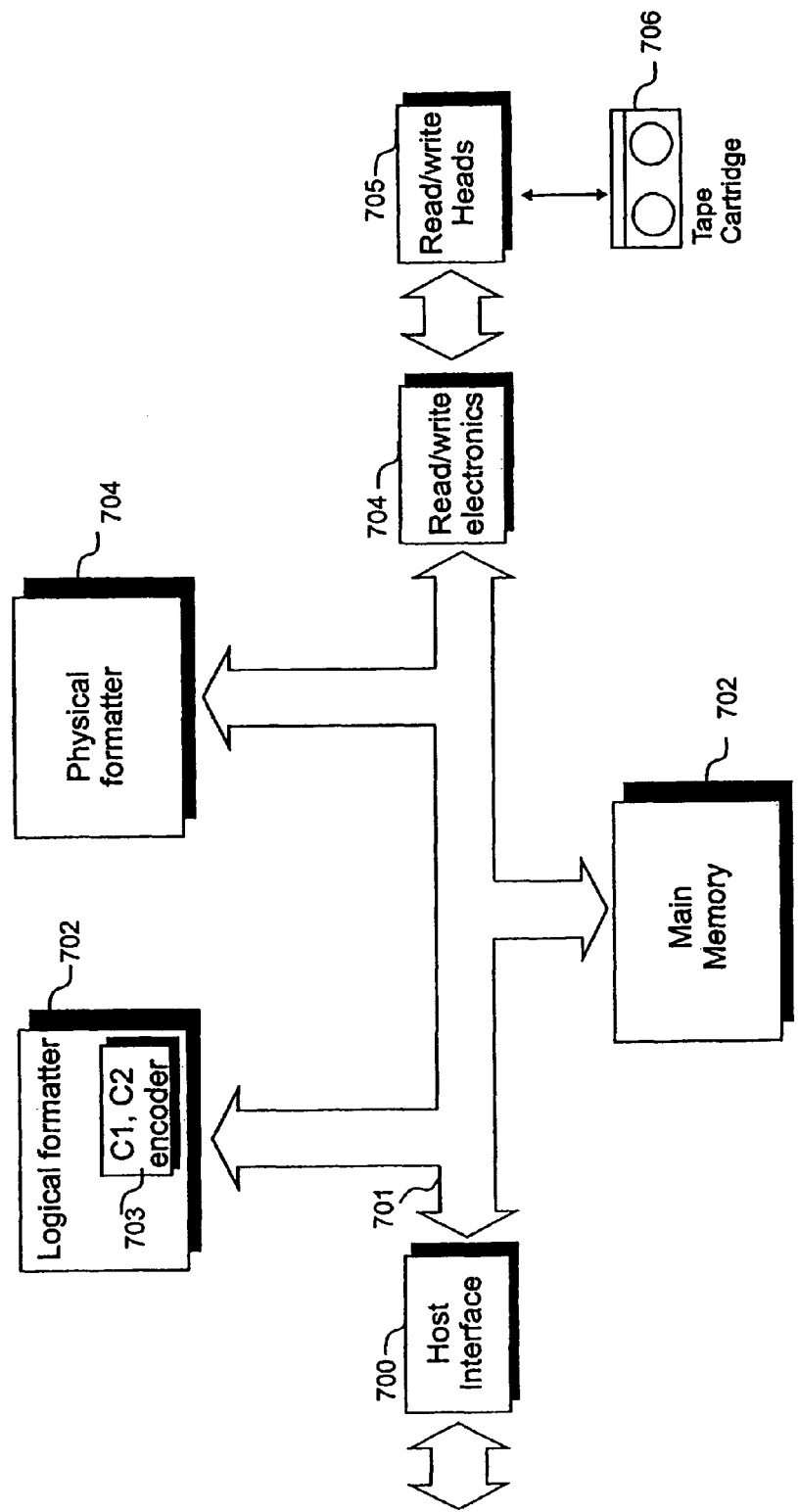
FIG. 7 is a block diagram of a data processing apparatus for writing the diagonal tracks of FIG. 6 onto a tape.

Referring to FIG. 7 herein, there is schematically illustrated a tape data storage system, according to a specific embodiment of the present invention. The tape data storage system comprises: a host interface 700 for receiving user data from a host device, for example a host computer; an internal data bus 701; a main memory buffer 702 for storing user data whilst it is being formatted and error correction coded; a logical formatter device 702 which operates to effectively arrange an incoming stream of host data into logical two dimensional arrays of data as described with a reference to FIG. 5 herein, the logical formatter comprising an error correction encoder 703 for applying an error correction code to rows and columns of each data subgroup as described herein; a physical formatter 704 for formatting logical data groups into a continuous stream of data fragments for writing as physical data tracks, there being 128 data fragments per physical diagonal data track; a read/write component 704 for writing data to at least one read/write head 705, and conversely, for reading data for accepting data from at least one read head; and one or a plurality of tape data storage cartridges 706, each containing a length of elongated tape. It is to be understood that logical formatter 702 effectively (but does not physically) arrange the incoming data stream into two dimensional arrays.

The write heads operate to write a plurality of data tracks sequentially along a length of the tape. Each physical track is written as a diagonal stripe across the width of the tape as described with reference to FIG. 6 herein. The elongated tape data storage medium in the cartridge 706 has a length of the order 170 m plus or minus 5 m, a width of the order 3.81 mm plus or minus 0.01 mm; a tape thickness of the order 5.3 μm, of which a substrate thickness is of the order of 3.6 μm.

Figure 8:
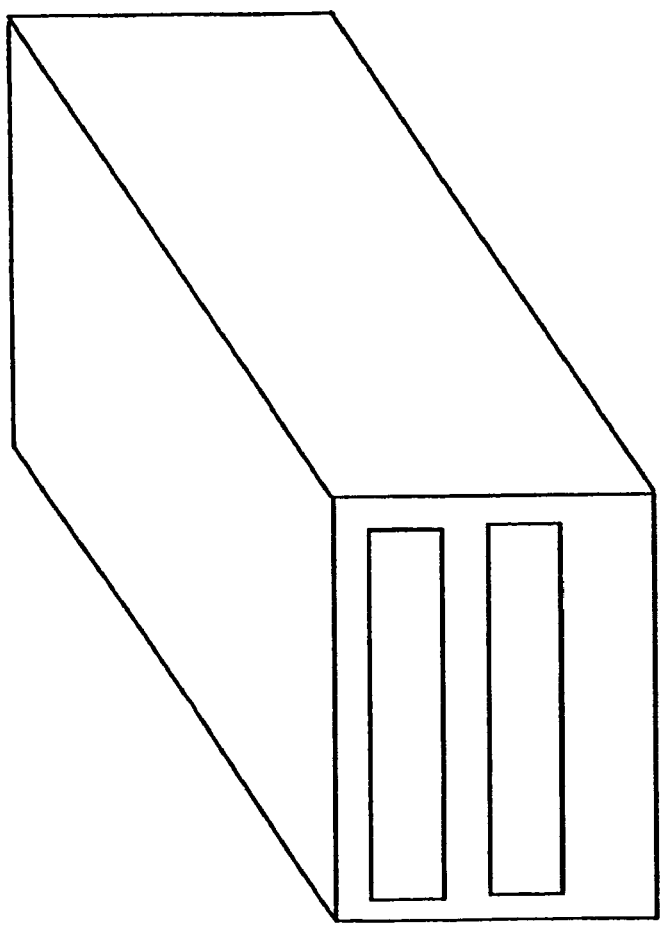
FIG. 8 is a schematic perspective view of a housing of tape drive unit for writing/reading the tape of FIG. 6 according to a specific embodiment of the present invention.

Referring to FIG. 8 herein, the tape data storage system as described with reference to FIG. 7 herein, can be implemented as a discrete stand alone tape drive unit, having its own casing, power supply, and connections.

In other embodiments, the tape data storage system may be implemented within a host computer or other computer entity within a same casing as the host computer or other computer entity.

The invention claimed is:

1. A method of writing a block of user data to a tape storage medium, said method comprising:
    arranging said block of user data into an array of bytes, said array comprising a plurality of rows and a plurality of columns of said bytes;
    applying an error correction code to individual ones of said rows of bytes, such that said error correction coded rows each comprise four code words, wherein each of the four code words in each corresponding error correction coded row includes data bytes and error correcting bytes;
    in each of said error correction coded rows, interleaving said four code words of the row; and
    writing said error correction coded rows each comprising four code words into a diagonal track that extends diagonally across a width of the tape storage medium.

2. The method as claimed in claim 1, further comprising:
    wherein interleaving said four code words in each of said error correction coded rows causes each code word to extend substantially along the entire length of said row.

3. The method as claimed in claim 2, wherein in each error correction coded row, a first code word, a second code word, a third code word, and a fourth code word of the four code words are interleaved in an order of a byte of said first code word, a byte of said second code word, a byte of said third code word and a byte of said fourth code word, the method further comprising:

repeating said interleaved order plural times along each of the rows to perform the interleaving.

4. The method as claimed in claim 1, wherein each of said rows comprises 128 bytes, and each of the code words comprises 32 bytes.

5. The method as claimed in claim 4, wherein each of said columns comprises 124 bytes.

6. The method as claimed in claim 1, wherein each of said columns is divided into a pair of interleaved code words.

7. The method as claimed in claim 1, wherein:

each of said error correction coded rows is divided into four interleaved C2 code words; and each of said columns is divided into two interleaved C1 code words.

8. A method of writing data to a linear tape data storage medium, said method comprising:

arranging a block of user data into a data group of a logical array of data bytes, the array comprising a plurality of rows of said data bytes and a plurality of columns of said data bytes;

applying error correction coding to individual ones of said rows, such that each of said rows is each arranged into four code words;

in each of said rows, interleaving said four code words of the row, wherein in each of the rows, a first code word, a second code word, a third code word, and a fourth code word of the four code words are interleaved in an order of a portion of the first code word, a portion of the second code word, a portion of the third code word, and a portion of the fourth code word, and wherein the interleaved order of the portion of the first code word, the portion of the second code word, the portion of the third code word, and the portion of the fourth code word is repeated to perform the interleaving;

writing said data group with the rows each having the interleaved code words as a single data track extending diagonally across the width of said tape data storage medium such that all of said data group is contained within said single data track extending across said width of said tape data storage medium.

9. The method as claimed in claim 8, wherein said data group comprises 448 C2 code words.

10. The method as claimed in claim 8, further comprising:

applying error correction coding to columns of said data group such that each said column comprises 2 code words; and in each of said columns, interleaving said 2 code words such that portions of the 2 code words are interleaved along the column.

11. The method as claimed in claim 8, wherein said data group comprises 256 C1 code words.

12. The method as claimed in claim 8, wherein said data track has a width in the range 5.4 μm, plus or minus 0.1 μm.

13. The method as claimed in claim 8, wherein said data are written to tape at a bit density in the range 6,220 to 6,614 bits/mm.

14. Data processing apparatus for arranging data into a format for writing to a tape data storage medium, said apparatus comprising:

a memory for storing a data group comprising a plurality of bytes of user data arranged in an array including columns and rows;

an error correction coding device for applying an error correction code to individual rows of said array, the error correction code being such that each said individual row is coded into four code words, wherein the four code words are interleaved along each said individual row, and wherein each of the four code words in each individual row includes data bytes and error correcting bytes; and a write head for writing said data group across the width of the tape data storage medium, such that said data group is written along a corresponding single track extending across the width of said tape data storage medium, and diagonal to a longitudinal length of said tape data storage medium.

15. A data processing device for arranging data into a format of an array of bytes arranged in rows and columns, said device comprising:

a memory for storing a logical array comprising a plurality of bytes of user data arranged logically in a plurality of rows and a plurality of columns; and an error correction coding device for applying an error correction code to individual ones of said rows of bytes, such that said individual rows are each coded into four code words to be written into a diagonal track that extends diagonally across a width of a tape storage medium, wherein the four code words in each said individual row are interleaved along said individual row, wherein in each of the rows, a first code word, a second code word, a third code word, and a fourth code word of the four code words are interleaved in an order of a portion of the first code word, a portion of the second code word, a portion of the third code word, and a portion of the fourth code word, and wherein the interleaved order of the portion of the first code word, the portion of the second code word, the portion of the third code word, and the portion of the fourth code word is repeated to provide the interleaved four code words.

16. The data processing device as claimed in claim 15, wherein:

said error correction coding device is configured to apply an error correction code to each said column of bytes, such that each said column is coded into two interleaved code words.

17. The data processing device as claimed in claim 15, wherein:

said error correction coding device is configured to code individual ones of said rows of bytes into four interleaved code words extending substantially along a whole length of each of said rows.

18. A method of writing data to a linear tape data storage medium, said method comprising:

arranging a block of user data into a logical group of data bytes, comprising a plurality of rows of said data bytes and a plurality of columns of said data bytes;

applying an error correction code to said data group such that each of said columns of said data group is coded with two interleaved C1 code words;

applying an error correction code to individual ones of said rows, such that each of said individual rows is arranged into four interleaved C2 code words, wherein in each of the rows, a first code word, a second code word, a third code word, and a fourth code word of the four C2 code words are interleaved in an order of a portion of the first code word, a portion of the second code word, a portion of the third code word, and a portion of the fourth code word, wherein the interleaved order of the portion of the first code word, the portion of the second code word, the portion of the third code word, and the portion of the fourth code word is repeated in each of the rows to provide the interleaving of the four C2 code words; and writing said group in a single data track across a width of said tape data storage medium, such that all of said group is located within said single data track extending across said width of said tape data storage medium.

19. A tape data storage system comprising:
at least one write head for writing data to a magnetic tape data storage medium;
a transport mechanism for transporting said tape data storage medium past said write head;
a logical formatting device for formatting data into a data group comprising an array of bytes of data logically arranged in a plurality of rows and a plurality of columns;
a memory for storing said logical array of data; and
an error correction coder for applying an error correction code to individual ones of said rows of bytes, such that said individual rows are each coded into four interleaved code words, wherein the at least one write head is to write the coded individual rows of the data group into a diagonal track of the magnetic tape data storage medium, and wherein each of the four interleaved code words in the corresponding individual row includes data bytes and error correcting bytes.

20. The data storage system as claimed in claim 19, wherein said data track extends diagonally across the width of said tape data storage medium.

21. The data storage system as claimed in claim 19, in combination with a tape data storage medium comprising a band of elongated tape having:
a width in the range 3.81 mm plus or minus 0.01 mm; and
a length in the range 170 meters (m) plus or minus 5 m.

22. A method of writing a block of user data to a tape storage medium, said method comprising:
arranging said block of user data into an array of bytes, said array comprising a plurality of rows and a plurality of columns of said bytes;
applying an error correction code to individual ones of said rows of bytes, wherein applying the error correction code to each said individual row of bytes results in the individual row having four interleaved code words, wherein each of the four interleaved code words in the corresponding error correction coded row comprises data bytes and error correcting bytes,
each of said row comprising 128 bytes, each of said columns comprising 124 bytes; and
writing said error correction coded rows each comprising four interleaved code words into a diagonal track of the tape storage medium that extends diagonally across a width of the tape storage medium.

23. A method of writing data to a tape data storage medium, said method comprising:
arranging a block of user data into a data group of a logical array of data bytes, the array comprising a plurality of rows of said data bytes and a plurality of columns of said data bytes;
applying error correction coding to individual ones of said rows, wherein applying the error correction coding to each said individual row of data bytes results in the individual row having four interleaved code words, wherein each of the four interleaved code words in the corresponding error correction coded row comprises data bytes and error correcting bytes;
writing said data group as a single data track extending across a width of said tape data storage medium such that all of said data group is contained within said single data track extending across said width of said tape data storage medium,
said data group comprising 448 C2 code words.

24. A method of writing a block of user data to a tape storage medium, said method comprising:
arranging said block of user data into an array of bytes, said array arranged as a plurality of rows and a plurality of columns of said bytes; and
applying an error correction code to individual ones of said rows of bytes, wherein applying the error correction code to each said individual row of bytes results in the individual row having four interleaved code words, wherein each of the four interleaved code words in the corresponding error correction coded row comprises data bytes and error correcting bytes,
each of said rows comprising 128 bytes, each of said columns comprising 124 bytes; and
writing said error correction coded rows each comprising four interleaved code words into a diagonal track that extends diagonally across a width of the tape storage medium.

25. A method of writing data to a tape data storage medium, said method comprising:
arranging a block of user data into a data group of a logical array of data bytes, the array arranged as a plurality of rows of said data bytes and a plurality of columns of said data bytes;
applying error correction coding to individual ones of said rows, wherein applying the error correction coding to each said individual row of bytes results in the individual row having four interleaved code words, wherein each of the four interleaved code words in the corresponding error correction coded row comprises data bytes and error correcting bytes;
writing said data group as a single data track extending diagonally across the width of said tape data storage medium such that all of said data group is contained within said single data track extending across said width of said tape data storage medium,
said data group including 448 C2 code words.

26. The method of claim 8, wherein writing said data group as the data track comprises writing said data group as a diagonal data track that extends diagonally across the width of said tape data storage medium.

27. The method of claim 18, wherein writing said group to the single data track comprises writing said group to a diagonal data track that extends diagonally across the width of said tape data storage medium.

28. The data processing apparatus of claim 14, wherein the error correction coding device is configured to further apply error correction coding to each of the columns to form two code words in each column, wherein the two code words in each column are interleaved such that portions of the two code words are interleaved along the column.

29. The tape data storage system of claim 19, wherein the error correction coder is configured to further apply error correction coding to each of the columns to form two code words in each column, wherein the two code words in each column are interleaved such that portions of the two code words are interleaved along the column.

30. The method of claim 22, further comprising applying error correction coding to each of the columns to form two code words in each column, wherein the two code words in each column are interleaved such that portions of the two code words are interleaved along the column.

31. The method of claim 23, further comprising applying error correction coding to each of the columns to form two code words in each column, wherein the two code words in each column are interleaved such that portions of the two code words are interleaved along the column.

32. The method of claim 24, further comprising applying error correction coding to each of the columns to form two code words in each column, wherein the two code words in each column are interleaved such that portions of the two code words are interleaved along the column.

33. The method of claim 25, further comprising applying error correction coding to each of the columns to form two code words in each column, wherein the two code words in each column are interleaved such that portions of the two code words are interleaved along the column.

34. The method of claim 1, wherein in each of the rows, a first code word, a second code word, a third code word, and a fourth code word of the four code words are interleaved in an order of a portion of the first code word, a portion of the second code word, a portion of the third code word, and a portion of the fourth code word, the method further comprising:
repeating the interleaved order plural times in each of the rows to perform the interleaving.

35. The data storage system of claim 19, wherein in each of the rows, a first code word, a second code word, a third code word, and a fourth code word of the four code words are interleaved in an order of a portion of the first code word, a portion of the second code word, a portion of the third code word, and a portion of the fourth code word, the error correction coder is configured to further:
repeat the interleaved order plural times in each of the rows to provide the interleaving of the four code words.

36. The method of claim 1, wherein applying the error correction code to each individual row of bytes results in the individual row having four code words.

* * * * *

UNITED STATES PATENT AND TRADEMARK OFFICE
CERTIFICATE OF CORRECTION

| | | |
|---|---|---|
| PATENT NO. | : 7,831,869 B2 | Page 1 of 1 |
| APPLICATION NO. | : 10/986976 | |
| DATED | : November 9, 2010 | |
| INVENTOR(S) | : Andrew Hana et al. | |

It is certified that error appears in the above-identified patent and that said Letters Patent is hereby corrected as shown below:

In column 8, line 40, delete "123" and insert -- 123, column 0, --, therefor.

Signed and Sealed this
Fifth Day of July, 2011

David J. Kappos
*Director of the United States Patent and Trademark Office*